(12) United States Patent
Wiechers (10) Patent No.: US 7,222,056 B2
(45) Date of Patent: May 22, 2007

(54) METHOD FOR MINIMIZING THE ERROR OF A MEASURABLE QUANTITY

(75) Inventor: Joachim Wiechers, Planegg (DE)

(73) Assignee: CS Clean Systems AG, Ismaning (DE)

( * ) Notice: Subject to any disclaimer, the term of this patent is extended or adjusted under 35 U.S.C. 154(b) by 44 days.

(21) Appl. No.: 10/542,218

(22) PCT Filed: Dec. 16, 2003

(86) PCT No.: PCT/DE03/04147

§ 371 (c)(1),
(2), (4) Date: Sep. 19, 2005

(87) PCT Pub. No.: WO2004/057275

PCT Pub. Date: Jul. 8, 2004

(65) Prior Publication Data

US 2006/0142975 A1    Jun. 29, 2006

(30) Foreign Application Priority Data

Dec. 19, 2002  (DE) ............................... 102 59 719

(51) Int. Cl.
*H04B 15/00* (2006.01)

(52) U.S. Cl. ........................ 702/190; 702/67; 702/69; 327/555

(58) Field of Classification Search ................ 702/57, 702/66, 69, 70, 130, 132–134, 189–191, 702/193, 194; 327/553–555, 558; 375/350
See application file for complete search history.

(56) References Cited

U.S. PATENT DOCUMENTS

| 5,233,245 A * | 8/1993 | Romano et al. ............ 327/553 |
| 5,339,335 A | 8/1994 | Molnar |
| 5,465,410 A * | 11/1995 | Hiben et al. ................ 455/266 |
| 6,594,613 B1 * | 7/2003 | Ley et al. .................... 702/140 |
| 2004/0138859 A1 * | 7/2004 | Green ........................ 702/190 |

FOREIGN PATENT DOCUMENTS

| DE | 362 06 14 A1 | 6/1986 |
| DE | 198 46 453 C2 | 10/1998 |
| DE | 199 83 795 T1 | 12/1999 |
| WO | WO 00/034744 | 6/2000 |

* cited by examiner

*Primary Examiner*—Manuel L. Barbee
(74) *Attorney, Agent, or Firm*—Milde & Hoffberg, LLP (57) ABSTRACT

In the framework of the method for minimizing the error of a measured variable, particularly a signal to be measured using filtering at variable bandwidth, the bandwidth is regulated on the basis of a physical criterion inherent to the method in such a ways that signal changes not caused by noise are recognized as early as possible.

11 Claims, 9 Drawing Sheets

METHOD FOR MINIMIZING THE ERROR OF A MEASURABLE QUANTITY

BACKGROUND OF THE INVENTION

The present invention relates to a method for minimizing the error of a measured variable.

Typically, measured signals have a noise component in addition to the information component. The noise amplitude and/or the noise component of the measured signal is typically reduced through low-pass filtering at the cost of the response time.

For this reason, it is generally necessary to find a compromise between lower noise amplitude and shorter response time when evaluating a measured signal.

According to the related art, filters having a fixed high bandwidth, which have a short response time, are often used; filters of this type have a high noise amplitude, however. However, by using filters having a fixed low bandwidth, the noise amplitude may be reduced, but, as already noted, this procedure results in a longer response time.

Therefore, if a low noise amplitude Is desired in addition to a short response time, a filter having fixed bandwidth, as is taught in the related art, is not suitable.

Furthermore, methods for minimizing errors, which are based on controlling the bandwidth on the basis of fixed predefined values, are known according to the related art.

In this case, the results may only be optimum for a specific range of the signal.

SUMMARY OF THE INVENTION

The present invention is based on the object of specifying a method for minimizing the error of a measured variables particularly a signal to be measured, which avoids the disadvantages of the related art. In particular, a signal output which is optimum in regard to the noise and the response time is to be ensured.

According to the invention, a method for minimizing the error of a measured variable, particularly a signal to be measured using filtering at variable bandwidth, is proposed, in which signal changes not caused by noise, i.e., changes of the information component of the signal, are recognized as early as possible, the bandwidth being regulated on the basis of a physical criterion inherent to the method.

Preferably, according to the present invention, the bandwidth is regulated in such a way that the variation of the measured signal barely does not exceed a predefined multiple of the intrinsic noise of the measuring sensor; the bandwidth is preferably regulated by selecting the suitable filter from a filter bank, which may be a parallel circuit or a series circuit of filters.

Furthermore, it is possible to perform the filtering in a computer, so that no filter hardware is necessary. For a method implemented in a computer, a series circuit may be shown to be advantageous, since the output data of a filter may be used for calculating the output data of the following filter having lower bandwidth. In this case, a data rate reduction may occur, which saves significant computing time and storage space. In contrast, in a hardware-based achievement of the object, a parallel circuit provides the most rapid results, since in a series circuit the group run times (i.e., the response times) of the filters must be summed.

In this case, the intrinsic noises are calculated from the known spectral noise output densities of the measuring sensor and the bandwidth of the particular filter; advantageously, the difference of the observed filter output from a version of the signal whose bandwidth is delimited even more strongly is advantageously observed as a variation of the measured signal.

In particular, starting from a filter of the highest available bandwidth, smaller and smaller bandwidths are observed until, as already explained, the current variation of the measured signal is greater than the associated intrinsic noise of the measuring sensor. The filter having the lowest bandwidth at which, both in this filter and in all filters having higher bandwidth, the variation of the measured signal does not exceed a predefined multiple of the intrinsic noise of the measuring sensor at this instant, is selected and used for display. If no filter output having this property may be established, the filter output having the highest bandwidth is selected, since its response time is the shortest.

Through the method according to the present invention, it is ensured that a signal change not caused by noise, i.e., a variation of the information component, is recognized as early as possible, since the next lower filter has a variation in the measured signal which is greater than the intrinsic noise, so that there must be a signal change not caused by noise. In addition, the signal change may not be recognized earlier, since all filters of higher bandwidth have variations so large that they cover the information component of the signal. The earliest-possible recognition of the change in the information component of the signal, which is achievable according to the present invention, is an important advantage in thermal radiation detectors or further safety-relevant applications, for example. Furthermore, the method presented here has the advantage that the bandwidth regulation is based on a physical criterion.

In the framework of a variation of the method according to the present invention, instead of the above-mentioned criterion, a less restrictive criterion may be used or, instead of the filter from the filter bank, a standardized linear combination of at least two outputs of the filter bank may be used.

The filters used are preferably low-pass filters.

The method presented here is free of feedback and offers stability based on a principle.

For a full understanding of the present invention, reference should now be made to the following detailed description of the preferred embodiments of the invention as illustrated in the accompanying drawings.

Figure 1:
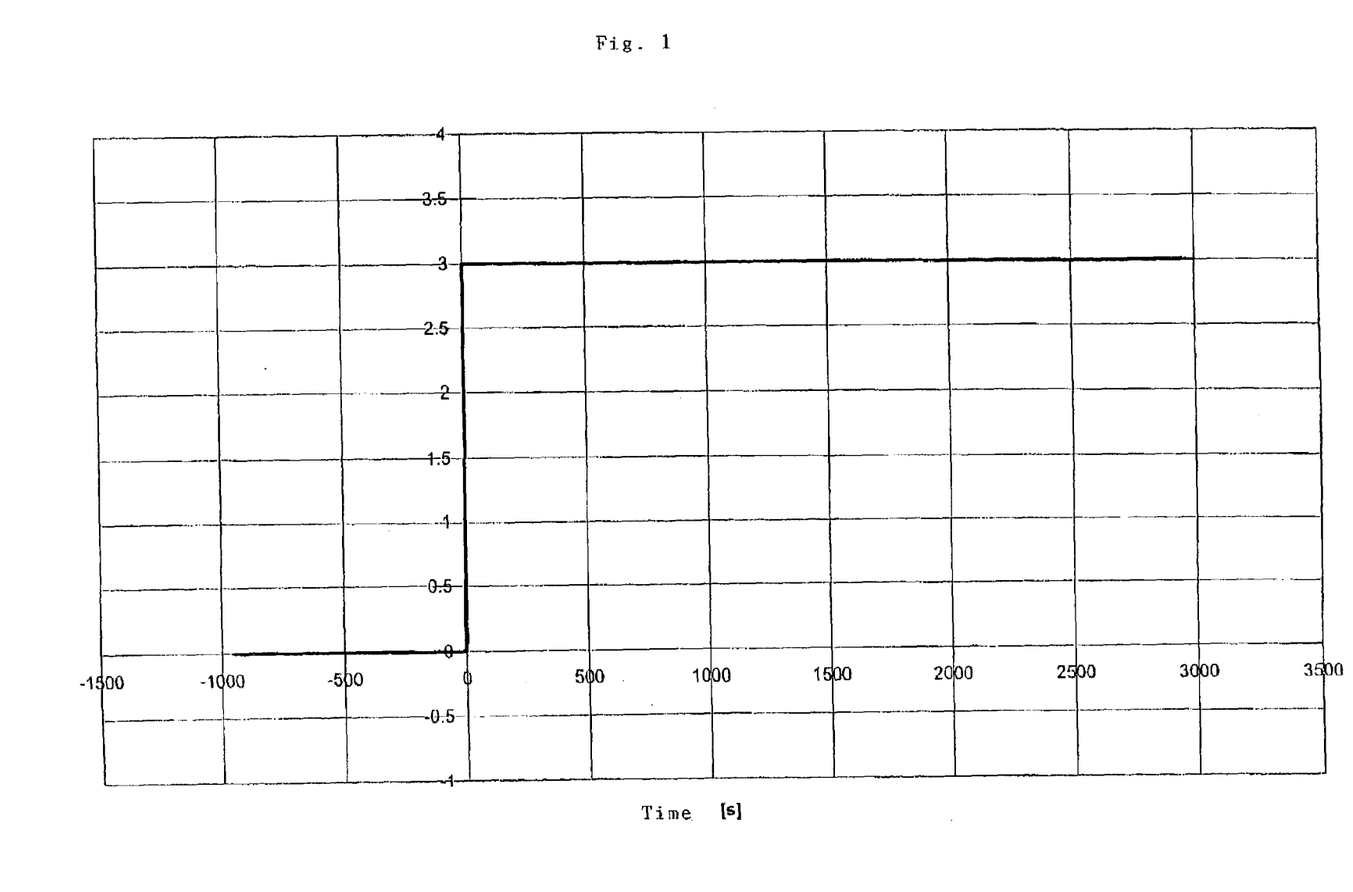
FIG. 1 shows an illustration of a signal without noise as a function of time, i.e., an illustration of the information component of the signal. In all further figures, the spectral noise output density of the measured signals is always 1/Sqrt(HZ).

The idealized case of a signal without noises is illustrated in FIG. 1. The signal performs a jump from 0 to 3 at the instant t=0 and then remains constant.

Figure 2:
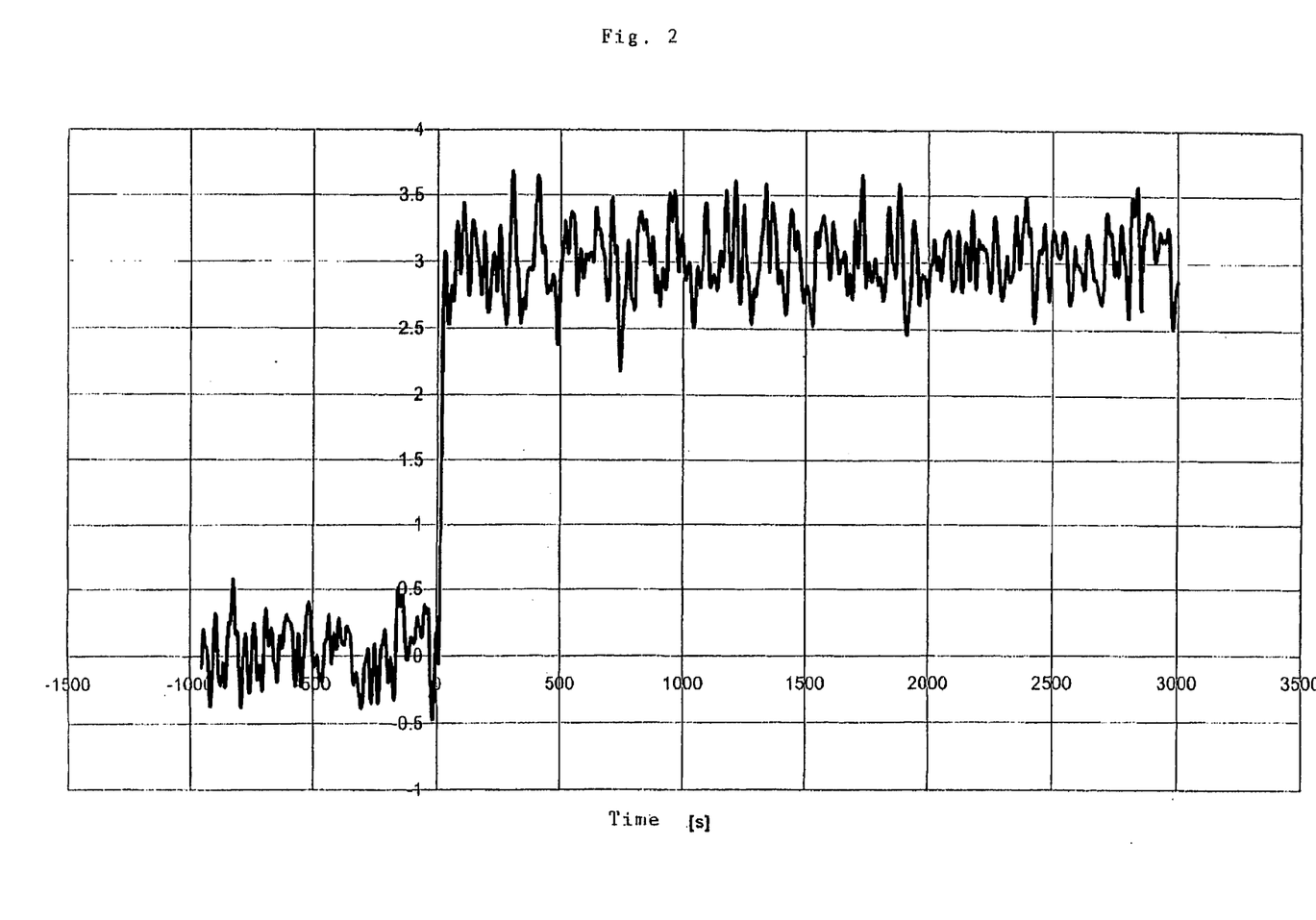
FIG. 2 shows an illustration of the signal shown in FIG. 1 having noises as a function of time, the signal having been conducted through a filter having a bandwidth of 25 MHz.
Figure 3:
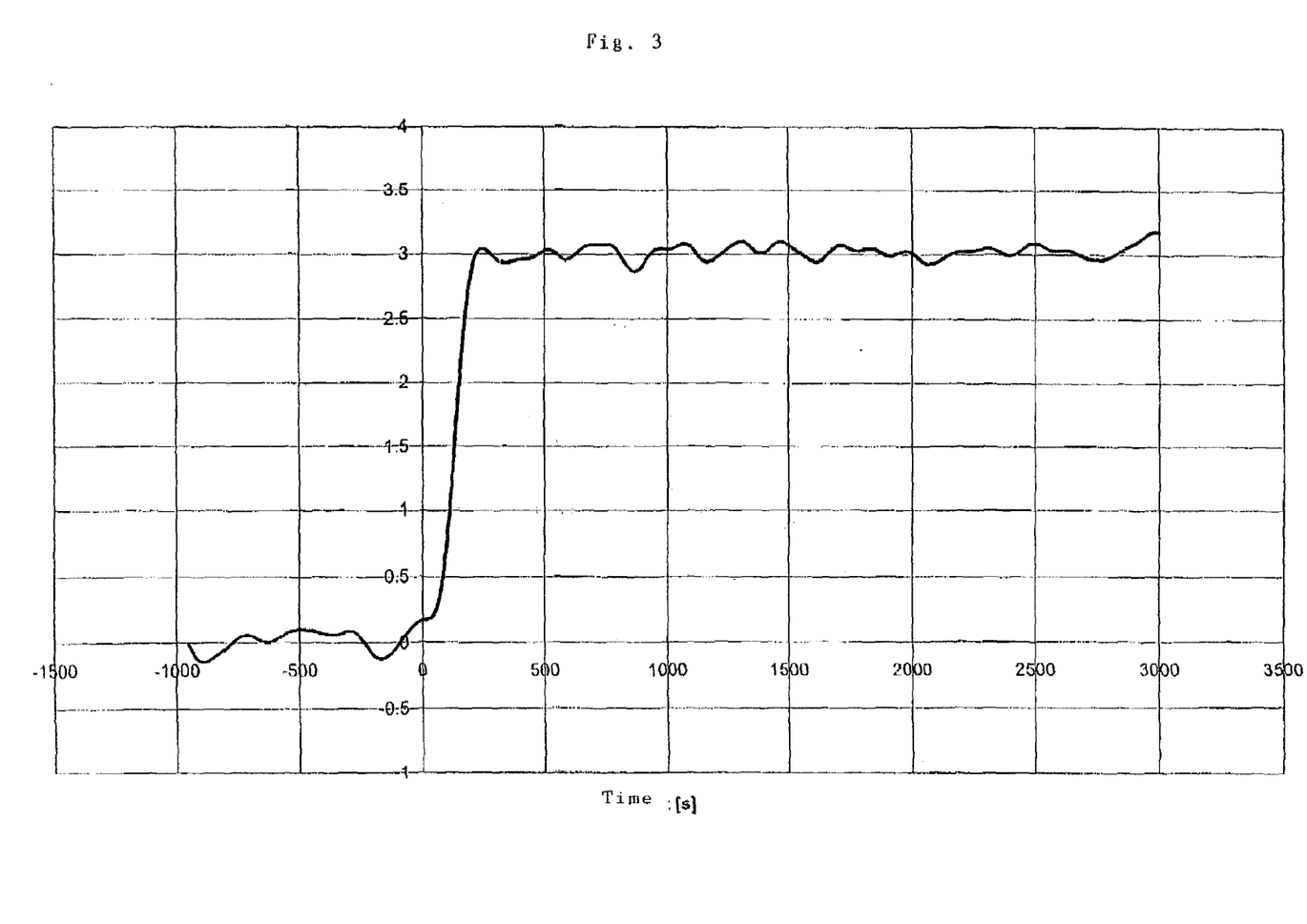
FIG. 3 shows an illustration of the signal shown in FIG. 1 having noises as a function of time, the signal having been conducted through a filter having a bandwidth of 3 MHz.
Figure 4:
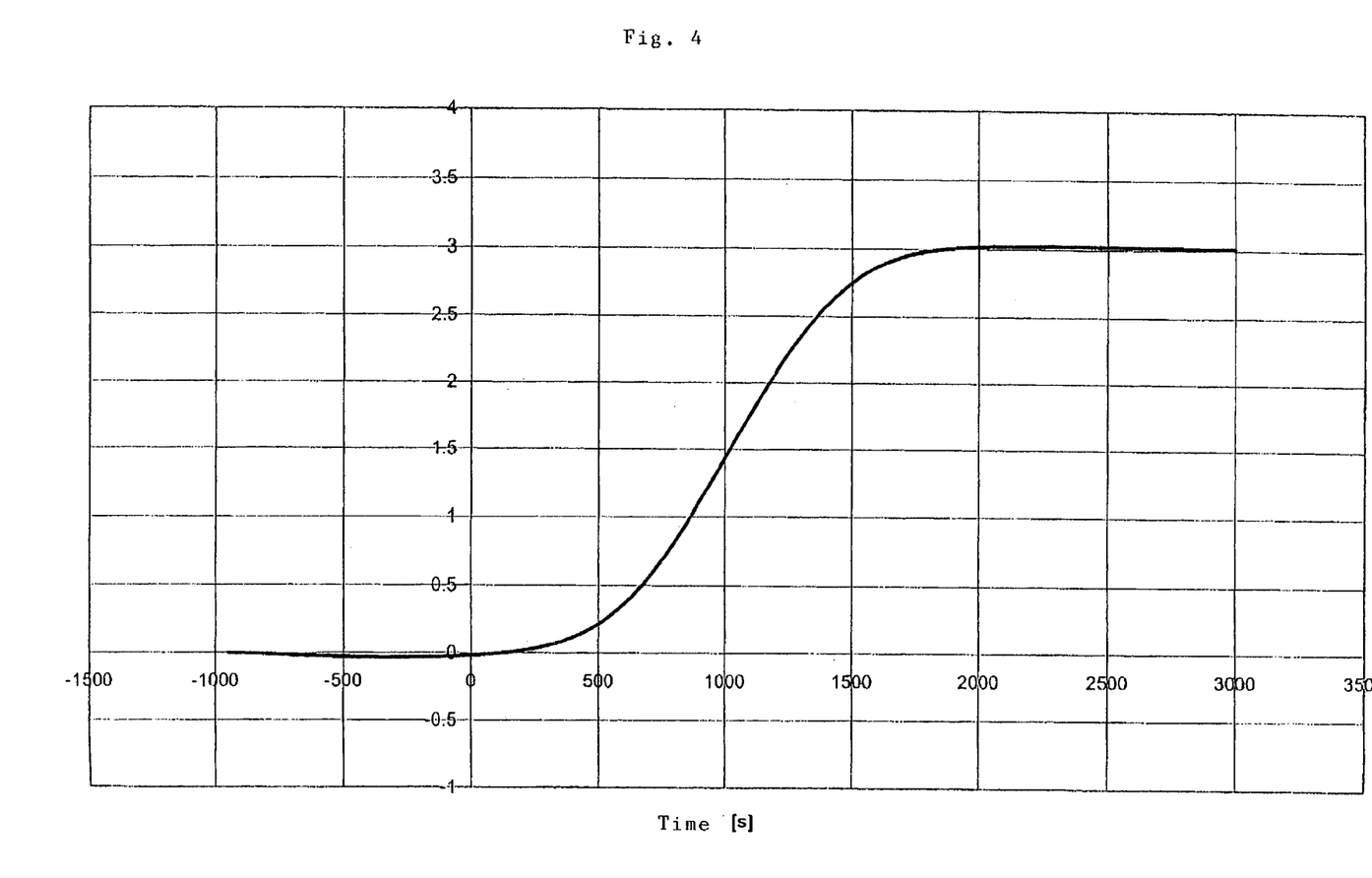
FIG. 4 shows an illustration of the signal shown in FIG. 1 having noises as a function of time, the signal having been conducted through a filter having a bandwidth of 0.4 MHz.

FIGS. 2, 3, and 4 provide a realistic illustration. In this case, the signal from FIG. 1 is illustrated having noises at different bandwidths, the signal being sent through low-pass filters having different bandwidths for this purpose. The bandwidths are 25 MHz for FIG. 2, 3 MHz for FIG. 3, and 0.4 MHz for FIG. 4. As may be inferred from FIGS. 2, 3, and 4, the signal having higher bandwidth has a higher noise amplitude; however, the jump at t=0 is shown more rapidly.

Figure 5:
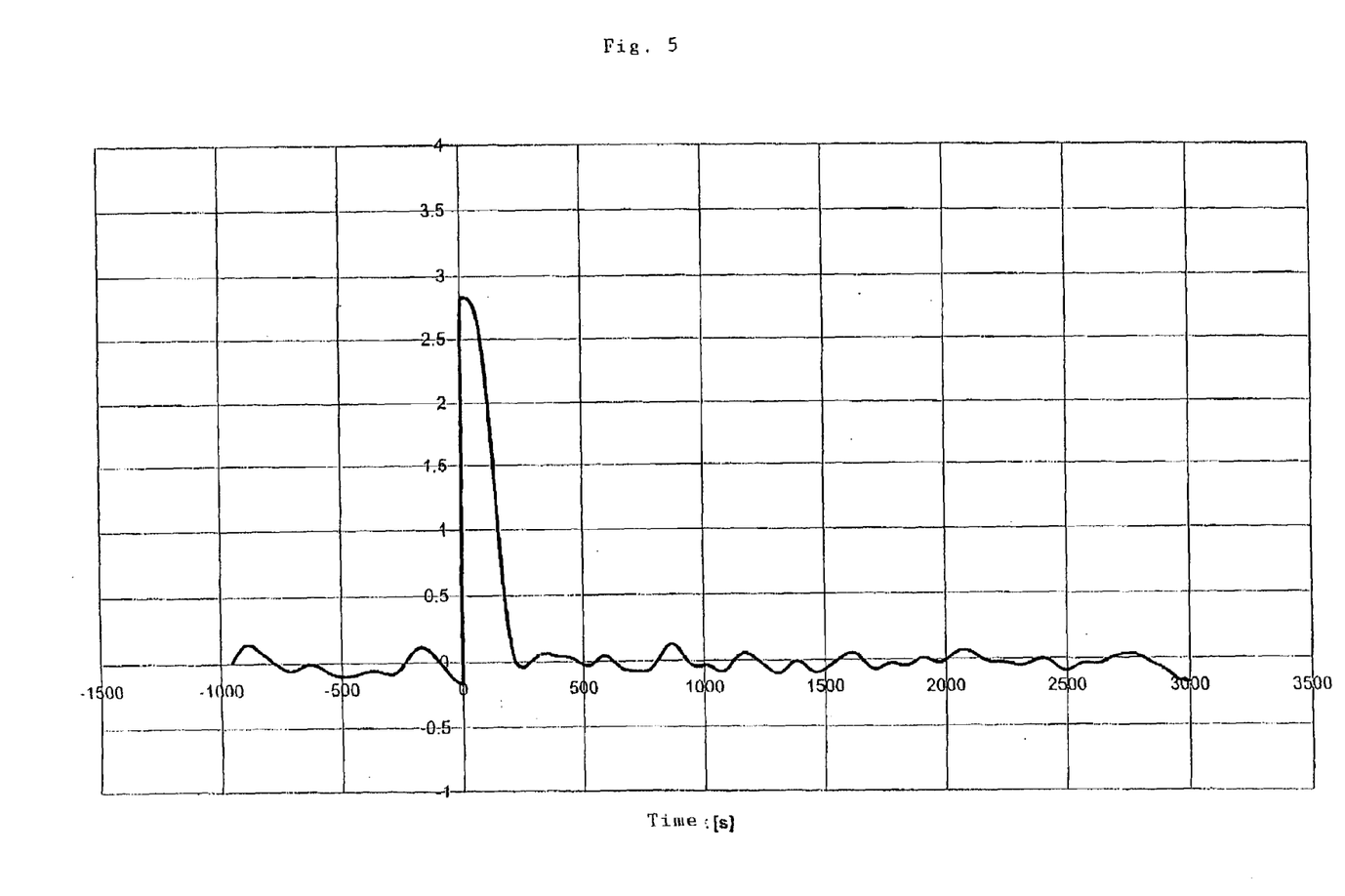
FIG. 5 shows an illustration of the error signal for the signal shown in FIG. 3.

The error signal for a bandwidth of 3 MHz is illustrated in FIG. 5. The error signal is the difference between information component, shown here in FIG. 1, and the measured signal after a low-pass filter (having a bandwidth of 3 MHz as shown in FIG. 3 here). From the instant t=0 up to the response time of the low-pass filter, the error corresponds to the entire height of the jump; the response time of the low-pass filter is approximately 130 seconds in this case. This means that the rapid and/or significant signal change (i.e., the jump) is only recognized after approximately 130 seconds. Subsequently, as shown in FIG. 3, the error signal is dominated by the noise which is characteristic for the bandwidth of the filter.

According to the present invention, a signal may be generated which has a smaller error than the exemplary 3 MHz filter, because a filter output having higher bandwidth is observed for times shortly and/or directly after the jump and a filter output having lower bandwidth is observed for later instants. In this way, the advantages of higher and lower bandwidth are advantageously combined.

For example (in the framework of the example shown here), for instants up to t=200 seconds, a filter having higher bandwidth than 3 MHz may be used, which does have a higher noise amplitude than the 3 MHz filter, but has a shorter response time, so that the error is lower overall. For instants over t=1000 seconds, a filter having lower bandwidth than 3 MHz may preferably be used, which, as already explained, has a lower noise amplitude than the 3 MHz filter. Therefore, the error resulting therefrom is lower than the error if a 3 MHz filter is used, if the information component remains constant and/or no rapid change occurs, so that an error is no longer to be expected from the long response time of the filter at lower bandwidth.

Figure 6:
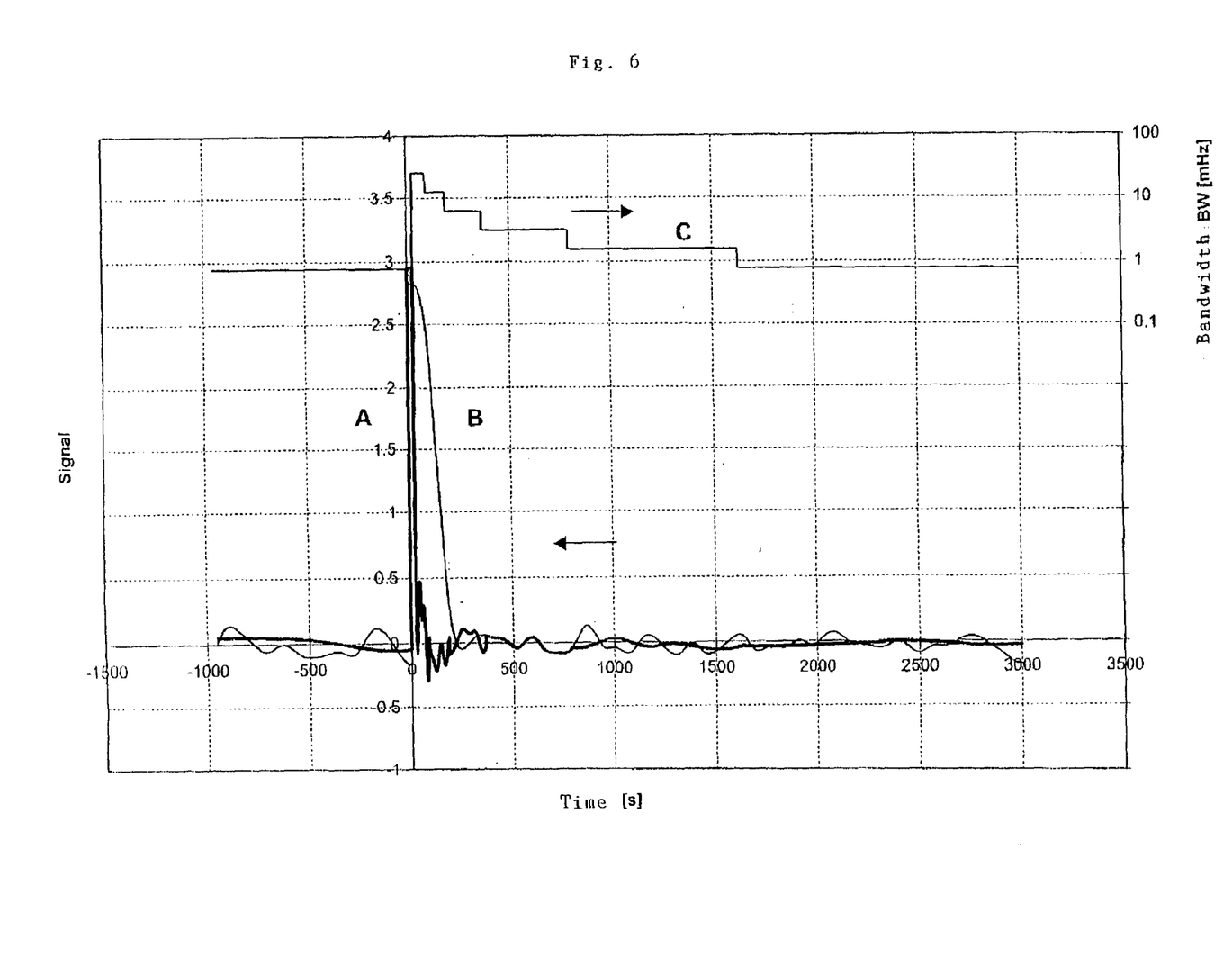
FIG. 6 shows an illustration of the error signal having controlled bandwidth according to the present invention.

This is illustrated in FIG. 6. In this case, curve A shows the "improved" error signal which results from the bandwidth regulated according to the present invention. The error signal which corresponds to the use of a 3 MHz filter is illustrated as curve B for comparison. Furthermore, the particular bandwidth (in MHz) used in the filter which is displayed is illustrated on the basis of curve C, which is assigned to the right Y axis. Accordingly, bandwidths having values between 25 MHz and 0.75 MHz are used. The signal obtained through the present invention displays an error which corresponds to the error of the 3 MHz filter in the interval t=360 seconds to t=800 seconds. In the other regions, the error is significantly lower.

According to the present invention, the bandwidth is regulated in such a way that the variation of the observed signal barely does not exceed a predefined multiple of the intrinsic noise of the measuring sensor. The following procedure is preferably used to regulate the bandwidth of the filter: the absolute value of the distance of the observed filter output to a second filter output having lower bandwidth is analyzed. This means that the second filter having lower bandwidth represents the measured signal without noise for the observed filter. If the distance between the observed filter output and the second output of the filter having lower bandwidth is so small that the distance may be interpreted as random noise of the observed filter output, the observed filter may be used for display. Such a filter will be referred to as a permitted filter in the following.

If the distance between the observed filter output and the second output of the filter having lower bandwidth is so large that it may not be interpreted as random noise, a significant change of the information component is then recognized. This filter is not a permitted filter. This results in the use of a filter having higher bandwidth, since in this case a lower response time will minimize the error. At least three filters having different bandwidths are necessary to perform the method.

DESCRIPTION OF THE PREFERRED EMBODIMENT

The preferred embodiment of the present invention will now be described with reference to FIGS. 1–9 of the drawings. Identical elements in the two figures are designated with the same reference numerals.

A multiple of the standard deviation σ of the intrinsic noise of the measuring sensor is used as the threshold value for the absolute value of the distance of the observed filter output to a filter output of lower bandwidth, because of which the signal analysis is based on a physical criterion inherent in the measurement system. This avoids a filter being sought out on the basis of arbitrary parameters and/or parameters generated outside the measurement system and thus being displayed. If the distance between the observed filter output and a filter output of lower bandwidth is within the setpoint interval, then this distance corresponds to the random noise of the observed filter output.

Figure 7:
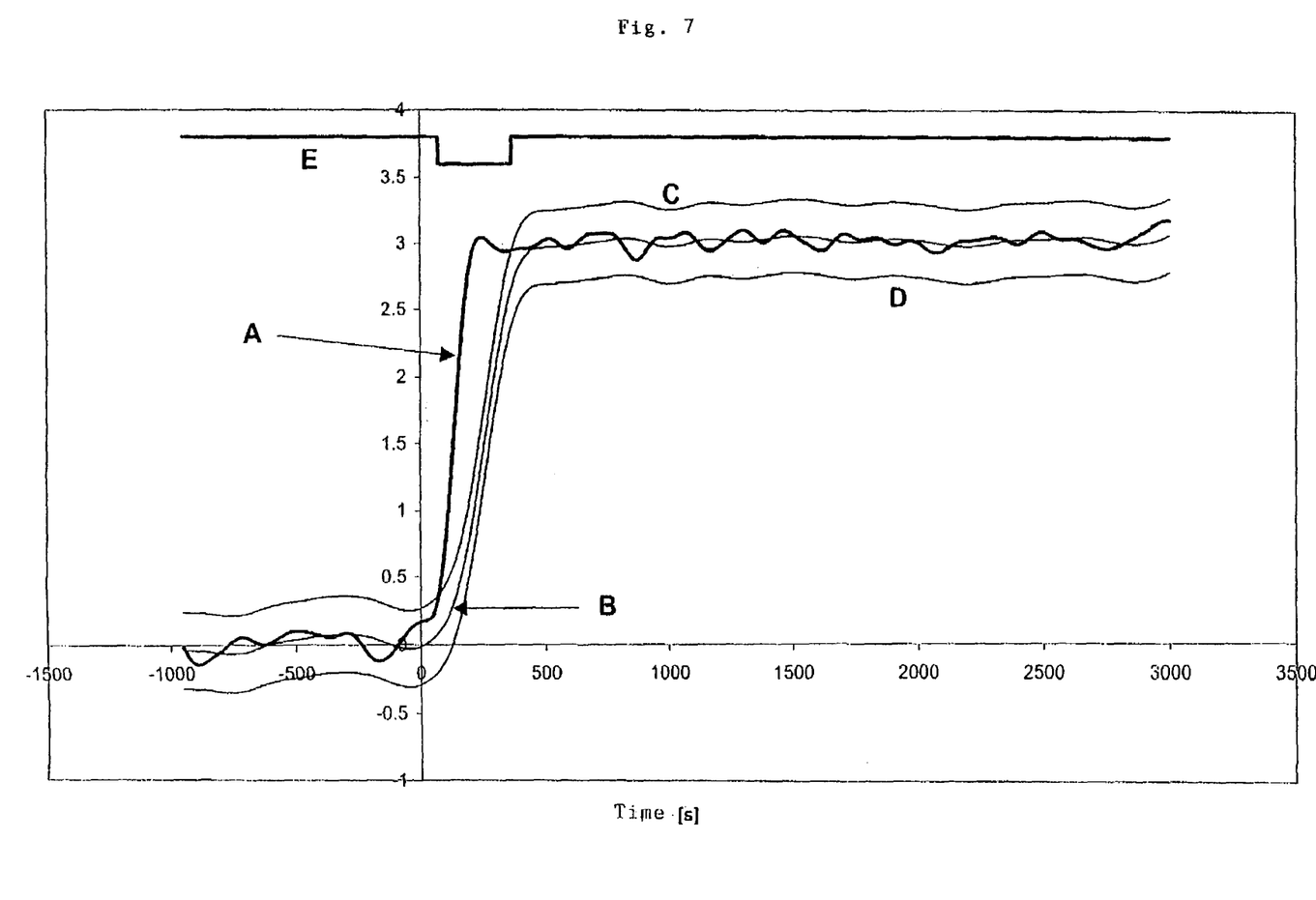
FIG. 7 shows an illustration of an exemplary decision procedure using two filters according to the present invention.

An exemplary decision procedure of this type is illustrated in FIG. 7. Curve A shows the signal obtained from a 3 MHz filter and curve B shows the signal obtained from a 1.6 MHz filter; curves C and D represent a band around the signal of the 1.6 MHz filter. This band corresponds to +/−5 σ of the intrinsic noise of the 3 MHz signal, so that the probability that the 3 MHz signal will leave the band at a constant information component is negligibly small.

According to the present invention, it is possible to observe only the upper, independent halves of the noise spectrum in order to eliminate the influence of the noise of the filter of lower bandwidth.

Curve E represents the curve of a logical signal which shows that the absolute value of the distance of the 3 MHz signal to the 1.6 MHz signal is less than 5 σ of the 3 MHz signal. This logical signal is thus the signal which displays whether and when an observed filter is a permitted filter and may be used for display.

As may be seen in FIG. 7, in the interval t=70 seconds to t=360 seconds, the 3 MHz signal leaves the 5 σ band around the 1.6 MHz signal. This means that according to the present invention, the 3 MHz signal between t=70 seconds and t=360 seconds may not be used for display, since the distance between the observed filter output and the output of the filter having the lower bandwidth of 1.6 MHz is so large that it may not be interpreted as random noise.

Figure 8:
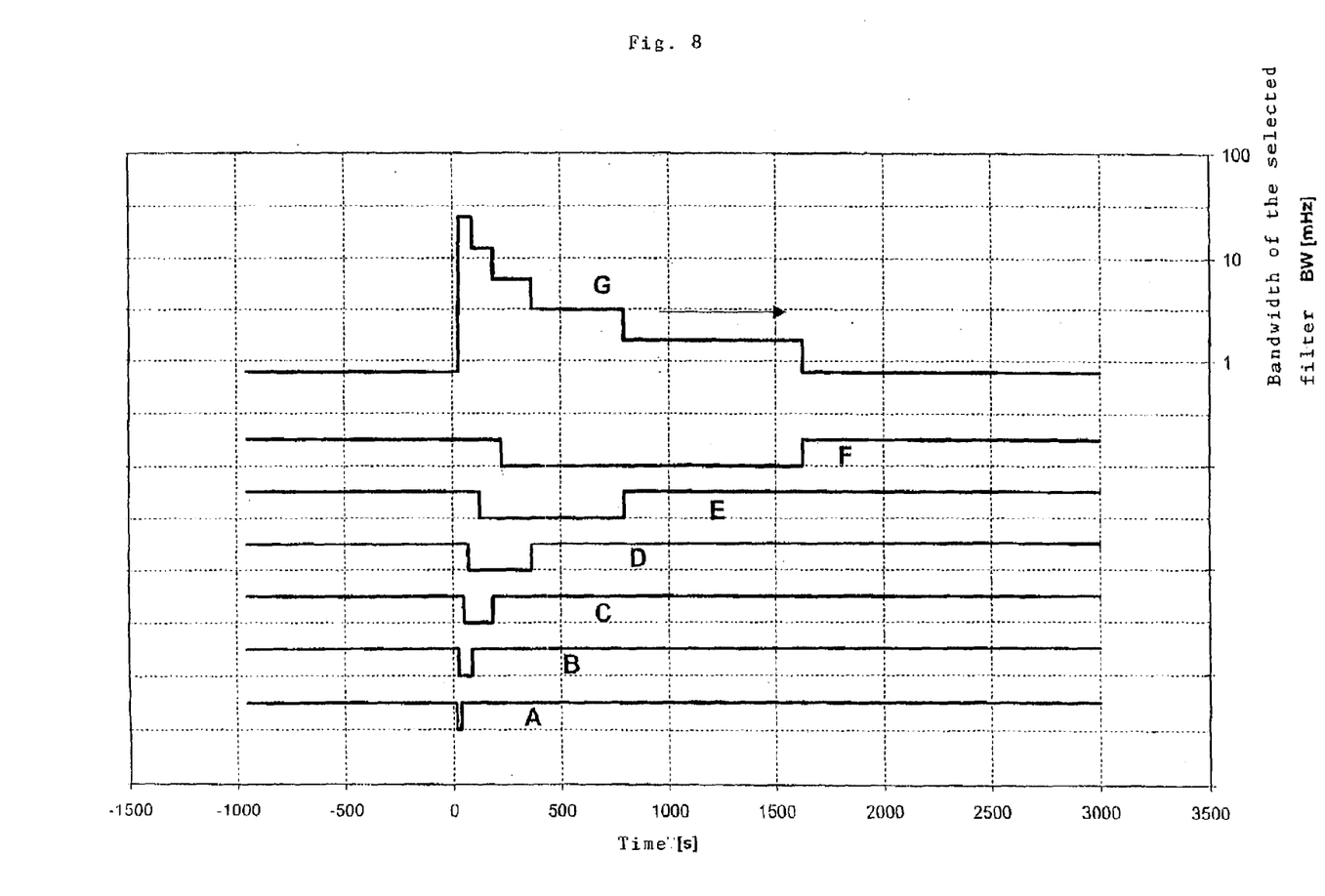
FIG. 8 shows an illustration of an exemplary decision procedure using multiple filters according to the present invention.

FIG. 8 shows the method for multiple filters of different bandwidths for exemplary purposes. In this case, the bandwidths of the filters are 25, 12, 6, 3, 1.6, and 0.8 MHz. In the figure, the logical signals corresponding to these filters are plotted as curves A, B, C, D, E, and F, respectively. Furthermore, the bandwidth of the filter which is the permitted filter having the smallest bandwidth is plotted as curve G (curve G is assigned to the right Y axis), all filters having higher bandwidth also being permitted filters.

Figure 9:
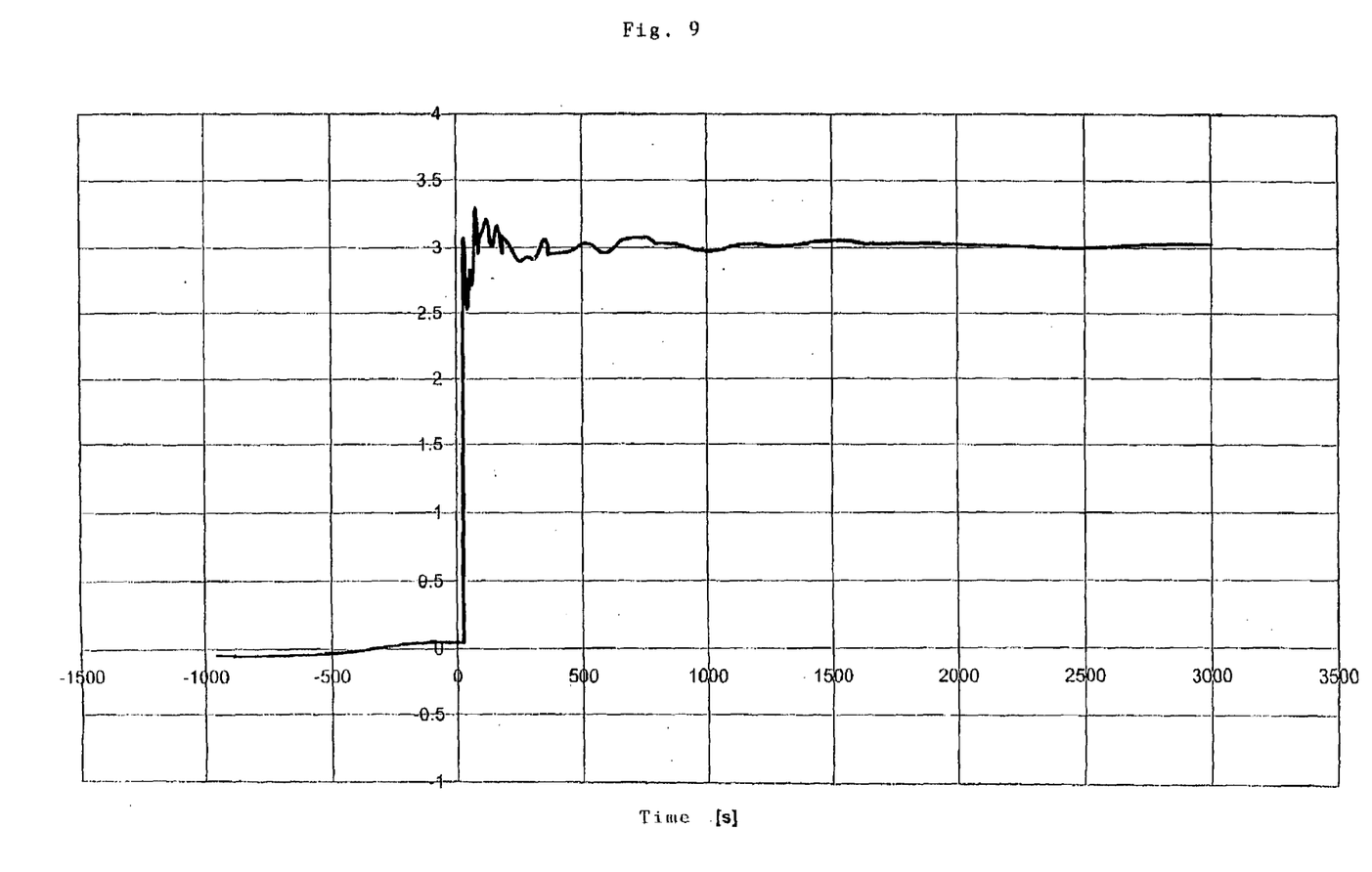
FIG. 9 shows an illustration of the output signal with controlled bandwidth according to the method according to the present invention.

FIG. 9 shows the output signal for controlled bandwidth according to the present invention. It may be seen from the figure that the displayed signal for controlled bandwidth follows the jump at t=0 rapidly; in addition, the noise becomes lower with increasing time.

The method presented here may be applied, for example, in an electronic balance, so that a usable display may be provided directly after a weight is laid on the balance. This is not yet very precise, but nonetheless immediately represents a value which corresponds to the current weight and not the prior display. If the weight remains on the balance longer, then the displayed result becomes more precise as time passes.

Furthermore, the method according to the present invention may be used to display the signals which are generated by a device for measuring small gas concentrations, such as a photometer having thermal detectors.

The method according to the present invention has the advantage that the bandwidth regulation is based on a physical criterion. If the spectral noise output density of the signal source is known, then the distance criterion for every filter may be derived therefrom. Preferably, the value 5 σ is selected, but other values or multiples of a are also conceivable. Fixing an arbitrary threshold value, which may not be suitable for a specific signal curve, is therefore excluded.

In addition, the data quantity required is reduced in comparison to the related art by the method according to the present invention. If, for example, the signals coming to the display are stored, then at lower bandwidths, correspondingly few data points are also necessary. According to the present invention, rapid signal changes are registered immediately if the information component stands out of the noise. For an information component which changes only slowly, only a few average values are stored over long times. The method does not harm the sampling theorem for signal components which stand out of the noise. Therefore, all information which the measuring sensor may register from the signal component may also be stored.

A further advantage of the method is that it is inherently stable, since there is no feedback. The application of the method in the case that the spectral noise output density of the signal is constant and is largely independent of the signal amplitude has been shown to be especially advantageous. This is the case in wide ranges for signals from sensors which are not quantum detectors, e.g., strain gauges, platinum and nickel thermistors, NTCs and PTCs, semiconductor temperature sensors, thermocouples, magnetoresistors, piezoresistive sensors, thermal radiation detectors, etc. In these cases, the noise amplitude is a function of the square root of the bandwidth, so that the regulation of the bandwidth is simple to perform, since in this case the distance criterion is especially simple, since the noise amplitude is smaller by the factor a if the bandwidth is reduced by the factor a*a.

There has thus been shown and described a novel method for minimizing the error of a measurable quantity which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A method for minimizing the error of a signal to be measured using filtering at variable bandwidth, said method comprising the steps of:
   determining an absolute value of the distance of an observed filter output to at least one further filter output having lower bandwidth;
   if the absolute value falls below a threshold value, which is a predefined multiple of the intrinsic noise of the measuring sensor, using the observed filter to display the signal;
   if the absolute value exceeds the threshold value, recognizing a significant change of the information component in the signal, using a filter having at least one of (a) higher bandwidth and (b) lower response time to display the signal;
   wherein the difference of the signal from a version of the signal whose bandwidth is delimited more strongly is observed as a variation of the signal; and
   wherein the bandwidth is regulated on the basis of a physical criterion inherent to the method in such a way that signal changes not caused by noise are recognized.

2. The method according to claim 1, wherein the bandwidth is regulated in such a way that the variation of the signal does not exceed a predefined multiple of the intrinsic noise of the measuring sensor.

3. The method according to claim 2, wherein the intrinsic noise is calculated from the known spectral noise output density of the measuring sensor and the bandwidth of the filter.

4. The method according to claim 1, wherein a suitable filter is selected from a filter bank in the framework of the bandwidth regulation.

5. The method according to claim 4, wherein a standardized linear combination of at least two outputs of the filter bank is used instead of an individual filter from the filter bank.

6. The method according to claim 4, wherein the filter bank is a parallel circuit of filters.

7. The method according to claim 4, wherein low-pass filters are used as filters in the filter bank.

8. The method according to claim 4, wherein the filter bank is a series circuit of filters.

9. The method according to claim 1, wherein the filter which has the lowest bandwidth of all filters whose output signals do not exceed the threshold value is used to display the signal to be measured.

10. The method according to claim 1, wherein the threshold value is a multiple of the standard deviation of the intrinsic noise of the measuring sensor.

11. The method according to claim 1, further comprising the steps of receiving the signal to be measured from a device selected from the group consisting of strain gauges, PT100 sensors, thermocouples, piezoresistive sensors, and thermal radiation detectors, and displaying the measured variable.

* * * * *